United States Patent
Pal (10) Patent No.: US 12,499,527 B2
(45) Date of Patent: Dec. 16, 2025

(54) REFERENCE-BASED VIDEO QUALITY ANALYSIS-AS-A-SERVICE (VQAaaS) FOR OVER-THE-TOP (OTT) STREAMING

(71) Applicant: Akamai Technologies, Inc., Cambridge, MA (US)

(72) Inventor: Urvashi Pal, Sydney (AU)

(73) Assignee: Akamai Technologies, Inc., Cambridge, MA (US)

(*) Notice: Subject to any disclaimer, the term of this patent is extended or adjusted under 35 U.S.C. 154(b) by 33 days.

(21) Appl. No.: 18/376,523

(22) Filed: Oct. 4, 2023

(65) Prior Publication Data

US 2025/0117907 A1 Apr. 10, 2025

(51) Int. Cl.
*H04N 21/24* (2011.01)
*G06T 7/00* (2017.01)
*H04N 19/154* (2014.01)
*H04N 21/2187* (2011.01)
*H04N 21/845* (2011.01)

(52) U.S. Cl.
CPC .......... *G06T 7/0002* (2013.01); *H04N 19/154* (2014.11); *H04N 21/2187* (2013.01); *H04N 21/2407* (2013.01); *H04N 21/8456* (2013.01)

(58) Field of Classification Search
CPC ............... G06T 7/0002; H04N 19/154; H04N 21/2187; H04N 21/8456
See application file for complete search history.

(56) References Cited

U.S. PATENT DOCUMENTS

| | | | |
|---|---|---|---|
| 6,246,435 B1* | 6/2001 | Patel | H04N 17/004 348/E17.001 |
| 9,014,279 B2* | 4/2015 | Steinberg | H04N 19/40 375/240.27 |
| 10,586,110 B2 | 3/2020 | Li | |
| 10,827,185 B2 | 11/2020 | Aaron et al. | |
| 11,165,848 B1* | 11/2021 | Larson | H04N 21/6377 |
| 11,563,794 B1* | 1/2023 | Choi | H04L 65/765 |
| 11,871,061 B1* | 1/2024 | Lin | H04N 21/23439 |
| 2010/0150245 A1* | 6/2010 | Camp, Jr. | H04N 19/33 375/240.25 |
| 2018/0115475 A1* | 4/2018 | Broom | H04N 21/44209 |
| 2019/0190976 A1 | 6/2019 | Chen et al. | |
| 2019/0268655 A1 | 8/2019 | Halepovic | |
| 2020/0021865 A1 | 1/2020 | Topiwala et al. | |

(Continued)

FOREIGN PATENT DOCUMENTS

AU 2021106663 A4 * 11/2021 ....... H04N 21/23418

OTHER PUBLICATIONS

PCT/US2024049517, International Search Report and Written Opinion, mailed on Jan. 15, 2025, 9 pages.

*Primary Examiner* — John R Schnurr
(74) *Attorney, Agent, or Firm* — David H. Judson (57) ABSTRACT

This disclosure provides for automated techniques to measure full reference-based QoE or VQA-as-a-Service (VQAaaS) for an Internet video stream. Generally, the approach herein involves pre-calculating VMAF scores for given media and then correlating those scores with VMAF scores computed from actual playback segments for the given media. By leveraging the pre-calculated VMAF scores and correlating them with playback data, the system provides for enhanced and accurate video quality analysis (VQA) to enable optimization of viewer Quality of Experience (QoE).

18 Claims, 9 Drawing Sheets

(56) References Cited

U.S. PATENT DOCUMENTS

| | | | |
|---|---|---|---|
| 2020/0126187 A1 | 4/2020 | Park et al. | |
| 2020/0169736 A1 | 5/2020 | Petajan et al. | |
| 2020/0195934 A1 | 6/2020 | Xing et al. | |
| 2020/0221141 A1* | 7/2020 | Katsavounidis | H04N 21/234345 |
| 2020/0252666 A1* | 8/2020 | Wallendael | H04N 19/149 |
| 2020/0314503 A1 | 10/2020 | Wang et al. | |
| 2020/0380290 A1* | 12/2020 | Sodhani | H04N 17/004 |
| 2021/0021805 A1 | 1/2021 | Gill et al. | |
| 2021/0044791 A1 | 2/2021 | Zhang et al. | |
| 2021/0352341 A1* | 11/2021 | Pahalawatta | H04N 21/2343 |
| 2021/0368182 A1* | 11/2021 | Pandit | H04N 19/132 |
| 2022/0103869 A1* | 3/2022 | Li | H04N 19/86 |
| 2022/0303457 A1* | 9/2022 | Bastide | H04N 5/2222 |
| 2022/0321892 A1 | 10/2022 | Liu et al. | |
| 2023/0041462 A1* | 2/2023 | Clift | H04N 21/2665 |
| 2023/0043881 A1* | 2/2023 | Clift | H04B 17/309 |
| 2023/0054130 A1 | 2/2023 | Wang et al. | |
| 2023/0066956 A1* | 3/2023 | Sen | H04N 21/44209 |
| 2023/0108298 A1* | 4/2023 | Sen | H04L 65/75 709/231 |
| 2023/0306740 A1 | 9/2023 | Rizk et al. | |
| 2024/0137591 A1* | 4/2024 | Lintz | H04N 21/2181 |
| 2024/0212118 A1* | 6/2024 | Liu | G06V 10/761 |
| 2024/0412484 A1* | 12/2024 | Ramachandiran | G06V 10/761 |

* cited by examiner

REFERENCE-BASED VIDEO QUALITY ANALYSIS-AS-A-SERVICE (VQAaaS) FOR OVER-THE-TOP (OTT) STREAMING

BACKGROUND

Technical Field

This application relates generally to media delivery over a network.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network.

Over the last 15 years, live streaming services have grown from novelties and experiments into profitable businesses serving an ever-growing cohort of users. Initial streaming implementations mimicked the workflows of the broadcast world, using custom servers to deliver streams via proprietary protocols. Recently, Over-The-top (OTT) live streaming has become ubiquitous and enabled significant growth in volume. One primary factor in the success of OTT delivery solutions was the transition in the mid-2000s to HTTP Adaptive Streaming (HAS), which used standard HTTP servers and TCP to deliver the content, thereby allowing CDNs to leverage the full capacity of their HTTP networks to deliver streaming content instead of relying upon smaller networks of dedicated streaming servers. The two dominant HAS formats are Apple® HTTP Live Streaming (HLS), and MPEG DASH. Since 2017, both formats can be supported in a single storage environment using the Common Media Application Format (CMAF). CMAF is a restricted version of a fragmented mp4 container and is similar to the DASH-ISO file format. CMAF is a standardized container that can hold video, audio or text data. CMAF is efficient because CMAF-wrapped media segments can be simultaneously referenced by HLS playlists ad DASH manifests. This enables content owners to package and store one set of files. The above-described live distribution side works in a similar manner with respect to "on-demand" media, which typically is stored in an origin. For on-demand delivery, the origin may be hosted in a CDN customer's own infrastructure or itself outsourced to the cloud, the CDN, or the like.

In recent years, there has also been a significant focus on measuring and enhancing the video quality of various media platforms. This emphasis stems from advancements in parameters, such as higher resolution and High Frame Rate (HFR) with progressive scanning (e.g., 2160p50) and Higher Dynamic Range (HDR) and BT.2020 color space. Additionally, there is a growing demand for new codecs like H.265, H.266, AV1 and Ultra Low Latency (ULL). These developments have prompted the industry to prioritize the evaluation and improvement of video quality across media platforms using objective, also known as reference-based, Video Quality Analysis (VQA) metrics like Video Multimethod Assessment Fusion (VMAF).

As further background, in a standard OTT scenario, a live feed from an SDI production camera is fed into an H.264/H.265 encoder for distribution and headend. The encoder compresses the live feed into the desired bitrate (which can be as low as 1 Mbps depending on the vendor and codec-video profile), and encapsulates the SDI feed into RTMP packets. These packets are then ingested into a transcoder (re-compressing and converting an already encoded stream), segmenter and a Just in Time (JIT) ABR packager. Depending on the packaging (HLS/DASH) by the video streaming server, video is streamed to a web URL. When the browser loads the URL, its ABR player requests for the video but receives the manifest file first. As noted above, this manifest file has information of all the transcoded video renditions the player needs to select, depending upon the available bandwidth, per segment. Although, there is no video quality degradation between the video streaming server and player on the internet, because OTT is not Constant Bit Rate (CBR), it is difficult to accurately evaluate the overall video streaming experience by parameters like buffer rate, time to play, and number of replays.

Presently, there is no appropriate methodology to perform reference-based VQA for a live or VOD internet stream due to various reasons, namely, not having access to a source stream, varying bitrate with every segment having varying resolution that does not match with the source clip, no automated workflow defined to perform this analysis, and complexity.

BRIEF SUMMARY

This disclosure provides for methods and systems to measure full reference-based QoE or VQA-as-a-Service (VQAaaS) for an Internet video stream. Generally, the approach herein involves pre-calculating VMAF scores for given media and then correlating those scores with VMAF scores computed from actual playback segments for the given media. By leveraging the pre-calculated VMAF scores and correlating them with playback data, the system provides for enhanced and accurate video quality analysis (VQA) to enable optimization of viewer Quality of Experience (QoE).

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
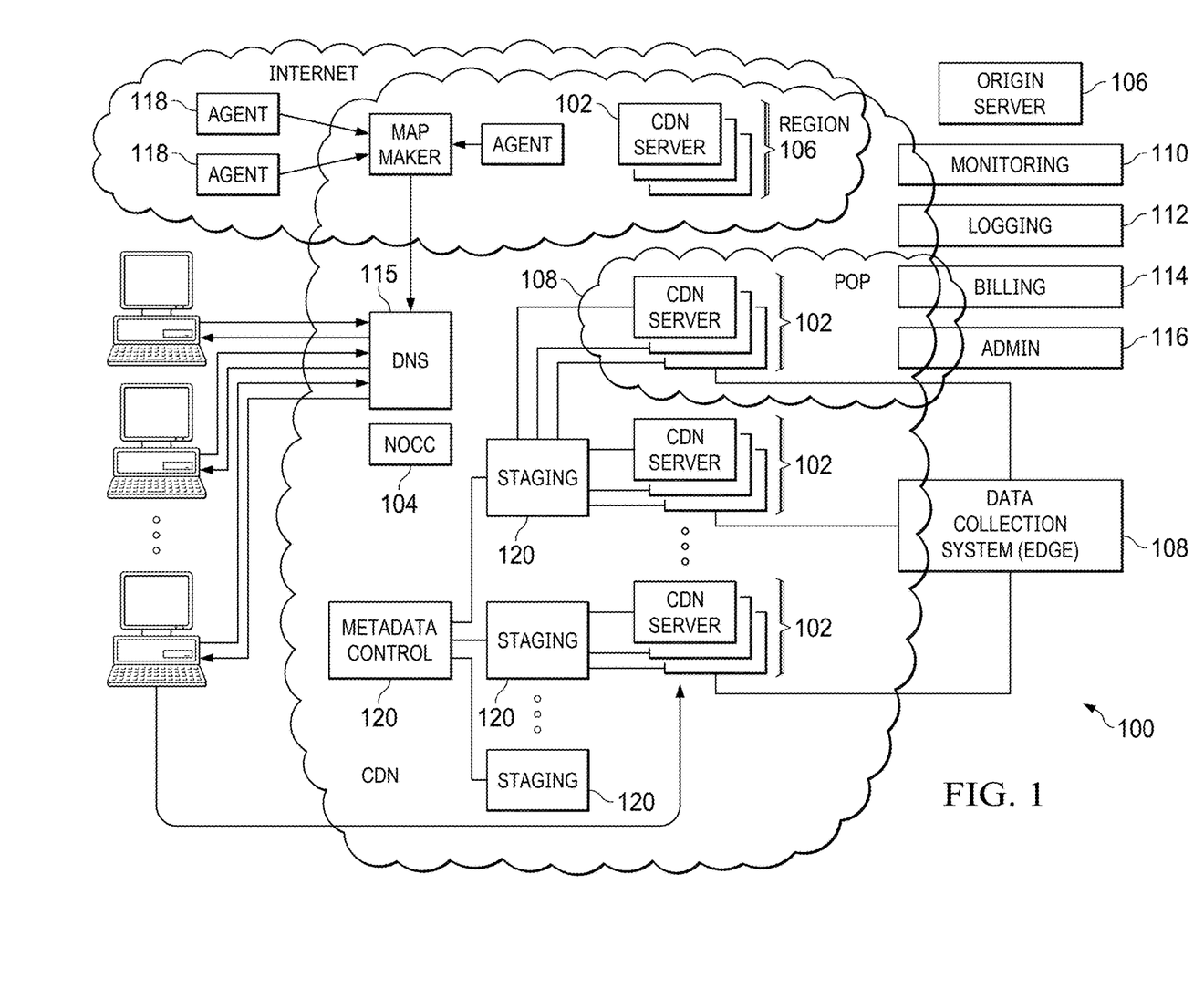
FIG. 1 is a block diagram illustrating a known distributed computer system configured as a content delivery network (CDN)

In a known overlay-type system, such as shown in FIG. 1, a distributed computer system 100 is configured as a content delivery network (CDN) and is assumed to have a set of machines 102*a-n* distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
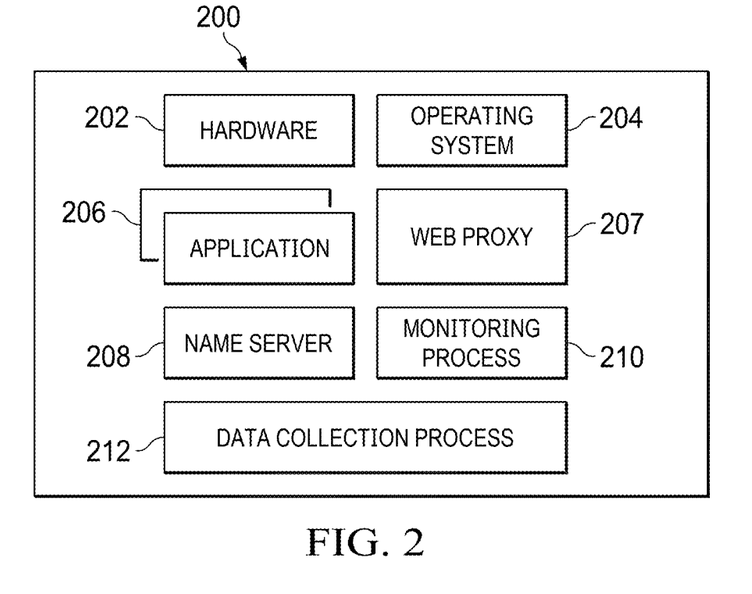
FIG. 2 is a representative CDN edge machine configuration.

As illustrated in FIG. 2, a given machine 200 in the above-described delivery network comprises commodity hardware 202 running an operating system kernel (such as Linux or variant) 204 that supports one or more applications 206*a-n*. To facilitate content delivery services, for example, given machines typically run a set of applications, such as an HTTP proxy 207, a name server 208, a local monitoring process 210, a distributed data collection process 212, and the like. For live or on-demand streaming media, and as described above, typically the machine as depicted in FIG. 2 provides HTTP-based delivery of chunked content fragments that constitute a media stream.

As noted above, Over-The-Top (OTT) streaming services have revolutionized video delivery over the internet, offering Adaptive Bit Rate (ABR) streaming via HLS/DASH/CMAF packaging to optimize viewer's Quality of Experience (QoE) based on the available network bandwidth per segment. ABR is a method of video streaming over HTTP where the source content is encoded at multiple bit rates. Each of the different bit rate streams are segmented into small multi-second parts, each typically a few seconds in length. In operation, a client requesting the source content downloads a file (playlist or manifest) that describes the available stream segments and their respective bit rates. During stream start-up, the client typically requests the segments from the lowest bit rate stream. As delivery progresses, the client may determine that the network throughput is greater than the bit rate of the downloaded segment, in which case the client requests a higher bit rate segment from the server. The client continues to request the highest bit rate segment that can be delivered efficiently, and the client can switch back to requesting a lower bit rate segment if if later determines that the network throughput has again deteriorated. The browser's ABR player offers optimal video quality delivery by dynamically adjusting to the available bandwidth. It prioritizes highest video quality when sufficient bandwidth is present, seamlessly transitioning to lower video quality options when bandwidth is limited. This ensures uninterrupted, real-time service to viewers while minimizing disruptions. The dynamic nature of ABR, however, can make it challenging to maintain a consistent video quality and viewer's QoE.

Figure 3:
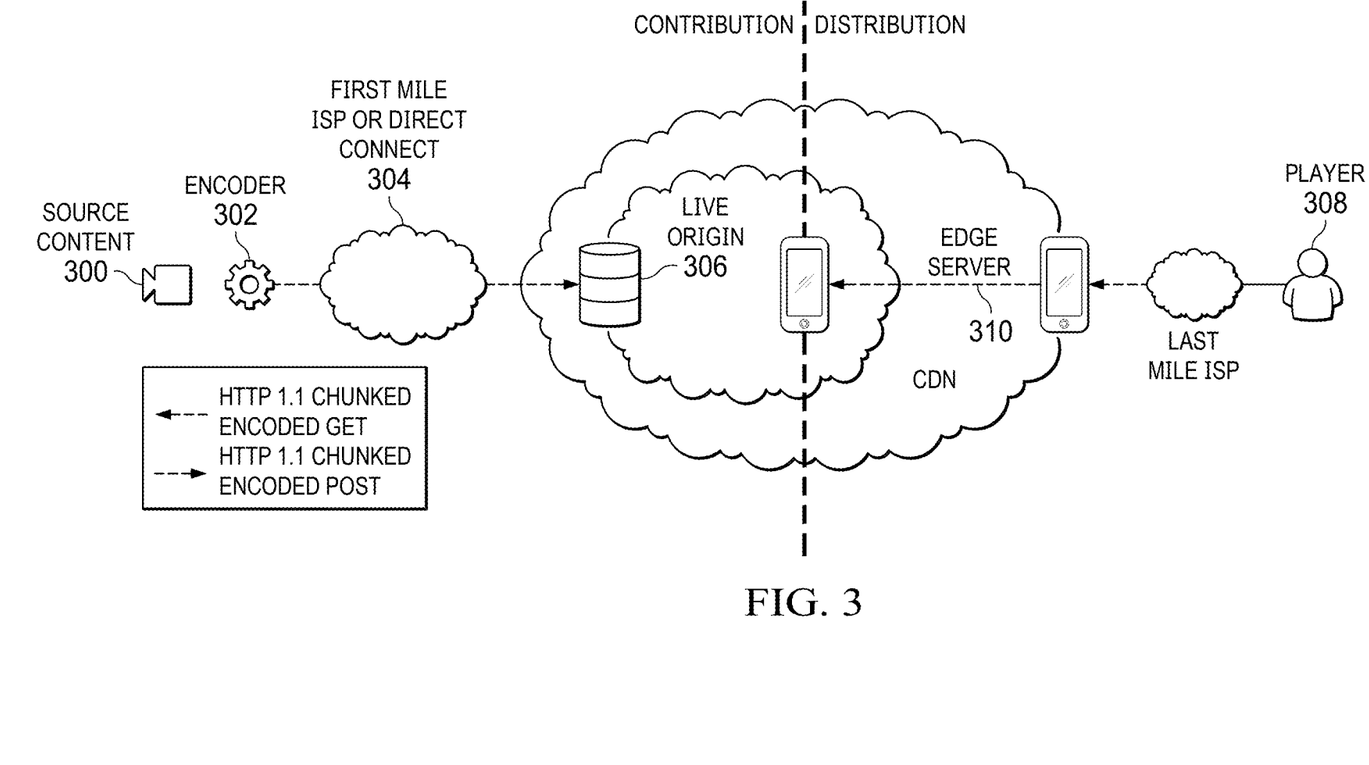
FIG. 3 is a typical ingest and CDN distribution solution.

FIG. 3 depicts a typical CMAF ingest and CDN distribution workflow for live streaming. The contribution side comprises a source camera 300, encoder 302, and a first mile ISP or direct connect network 304. After capture, the encoder pushes (via HTTP POST) the segments of the captured media to a live origin 306. A live origin has an ingest layer to accept the content, and a mid-tier layer to present the content for distribution. On the distribution side, a player 308 pulls the content chunks (via HTTP GET) from an edge server 310, which in turn sources them from the origin. Both of these halves need to work together to transfer the chunks as quickly as possible. Typically, this transfer is done using chunked transfer encoding. In operation, the encode uses HTTP 1.1 chunked transfer encoding to send an encoded CMAF chunk to the origin for redistribution. On the distribution side, and for client-side ABR, the chunk's journey is pull-based and driven by the media player. The media player reads a manifest or playlist, which describes the content, calculates a point (in the media stream) at which it wishes to start playback, and then makes a request for a segment. The player requests a segment and not a chunk, because the chunks are not addressable units typically. When asked for a segment, the CDN edge server returns all the chunks it has for that segment in sequential order using chunked transfer encoding. As more chunks arise from the origin, they are fed to the client until eventually the complete segment has been delivered. The CDN edge also caches the chunks flowing through it to build up a cached representation of the complete segment.

The above-described distribution side works in a similar manner with respect to "on-demand" media, which typically is stored in an origin. The origin may be hosted in a customer's own infrastructure or itself outsourced to the cloud, the CDN, or the like.

VMAF

Video Multimethod Assessment Fusion (VMAF) is an objective full-reference video quality metric that predicts subjective video quality based on a reference and distorted video sequence. The metric can be used to evaluate the quality of different video codecs, encoders, encoding settings, or transmission variants. VMAF uses existing image quality metrics and other features to predict video quality, namely: Visual Information Fidelity (VIF), which considers information fidelity loss at several different spatial scales; Detail Loss Metric (DLM), which measures loss of details, and impairments which distract viewer attention; and Mean Co-Located Pixel Difference (MCPD), which measures temporal difference between frames on a luminance component. The above features are fused, e.g., using a Support Vector Machine (SVM)-based regression, to provide a single output score in the range of 0-100 per video frame, with 100 being quality identical to the reference video. These scores are then temporally pooled over the entire video sequence using an arithmetic mean to provide an overall differential mean opinion score (DMOS). The training source code ("VMAF Development Kit", VDK) is available as open source, and thus the fusion method can be re-trained and evaluated based on different video datasets and features.

Conventionally, VMAF scores in the 70-100 range represent good/excellent video quality, in the 50-70 range fair/good video quality, in the 20-50 range poor video quality, and in the 0-20 range bad video quality.

With the above as background, the techniques of this disclosure are now described.

Reference-Based VQAaaS for OTT

Figure 4:
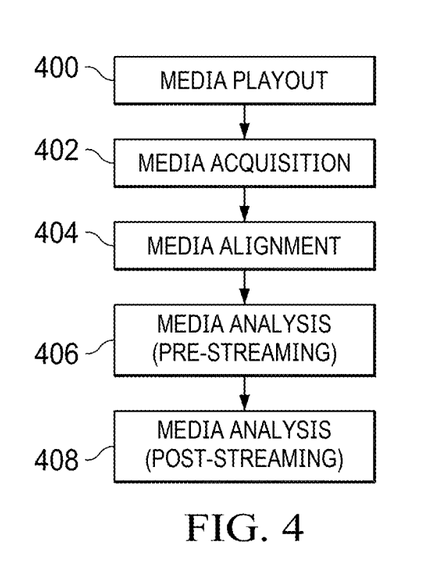
FIG. 4 depicts an exemplary high level workflow of the reference-based VQA service for OTT streaming of this disclosure.

FIG. 4 depicts an exemplary high level workflow of this disclosure. As mentioned above, generally the approach herein involves pre-calculating VMAF scores for given media and then correlating those scores with VMAF scores computed from actual playback data for the given media. By leveraging the pre-calculated VMAF scores and correlating them with playback data, the system provides for enhanced and accurate video quality analysis (VQA) to enable optimization of viewer Quality of Experience (QoE). The techniques herein typically are practiced in association with Adaptive BitRate (ABR) streaming via HLS/DASH/CMAF packaging, as described above with respect to FIG. 3, and such streaming media may be delivered by an overlay network such as the content delivery network (CDN) depicted in FIG. 1. Portions of the system may also be implemented on or in association with a cloud computing platform having compute instances implemented in one or more virtual machines.

As depicted in FIG. 4, in this example (but non-limiting) embodiment there are several stages in the workflow. Stage 1 (400) is a media playout stage during which the source media to be analyzed for VMAF is played out. In a representative use case (e.g., involving HLS live media), the media playout involves several operations, namely, ingesting the media output from an RTMP encoder, and using a live media server to convert the RTMP to HLS (unencrypted). Stage 1 typically occurs externally to the system. Stage 2 (402) is a media acquisition stage during which the source media is captured by the system in several forms, namely, the RTMP live stream (a raw clip), and in the HLS segments per rendition(s), the latter being identified in a manifest file or the like. Stage 2 typically is carried out by a content provider that has access to the encoder's RTMP output (acting as source) and a packager's ABR segments-per-renditions, and that has permissioned access to the VQAaaS platform. Stage 3 (404) is a media alignment stage wherein the frames of the raw clip (captured in Stage 2) are aligned with respect to each segment-per-rendition (captured in Stage 2). Stage 4 (406) is a media analysis (pre-streaming) stage during which a VMAF calculation per HLS rendition segment versus raw segment is carried out. These results are the pre-calculated VMAF scores that the system then correlates with actual playback data. To that end, Stage 5 (408) is a media analysis (post-streaming) stage that obtains actual playback data (typically a list of child segments in an order selected and played by an ABR media player), maps the playlist to the segment's pre-calculated VMAF results (from Stage 4), and analyzes VMAF score per frame (or for some average duration) to provide actionable QoE/VQA results. This completes the basic workflow.

The particular sequencing shown in FIG. 4 is not necessarily limited, as one or more stages may be combined. Further, the media alignment (for the post-processing) need not be carried out before the pre-processing. Other variations of this workflow may be implemented without departing from the techniques herein.

In the above-described system, typically a content provider is an overlay network (CDN) customer, and the overlay network and related systems and services are provided and managed by a service provider, such as Akamai® Technologies, Inc. of Cambridge, Massachusetts. The service provider, working in association with its content provider customer, provides the reference-based video quality analysis (VQA) "as-a-service" (VQAaaS). As noted above, the content provider has access to the encoder's RTMP output (acting as source) and packager's ABR segments-per-renditions. In the approach herein, preferably both are mirrored and captured on a local server periodically, e.g., every thirty (30) seconds. The source RTMP output is segmented to match ABR segments. As will be described in more detail below, an alignment algorithm is performed on the source segments and ABR segments for frame alignment. This algorithm leverages a non-linear full reference-based metric, Peak Signal To Noise (PNSR) ratio, which compares pixel values of an original reference image to the values of a degraded image. In the frame alignment process, each source frame's PSNR is calculated by comparing with every test frame, and the highest PSNR frame is selected as its best match. This approach to inter- and intra-frame alignment rules out any error caused due to duplicate or corrupt frames. Further, the technique herein does not require source and test feeds to be aligned before capturing. Instead, and as has been described, streams/segments are first captured and then aligned.

After the source segments and frames are fully aligned, and as also described above, VMAF is calculated and results are stored, e.g., in a cloud-based database (Stage 4 above). The technique herein then leverages the actual playback data to provide meaningful VQA analytics. To this end, and as noted, a browser's network logs has the list of child segments in the order they were selected and played by an ABR player, and this playlist is mapped to its segment's VMAF results. In this processing, there is a possibility that the local media server's segment numbers are different from the browser's. In such case, it is expected that the content provider has access to the decrypted segments and thus can download segments directly from the internet based on the network logs. Once again, and using the frame alignment algorithm (this time between the local ABR segments and the browser's ABR segments), the numbering convention is sorted, and correct VMAF scores are then mapped (Stage 5 above).

The above-described methodology can be applied to live, Video on Demand (VOD) and internal test setup. The entire workflow is fully automated with an orchestration layer and, as noted above, preferably it is offered as-a-service. VMAF results for different scenarios can then be analyzed over a network-accessible dashboard by an analytical tool. In a variant embodiment, a content provider (or other third party) practices the above-identified techniques in a standalone manner.

Figure 5:
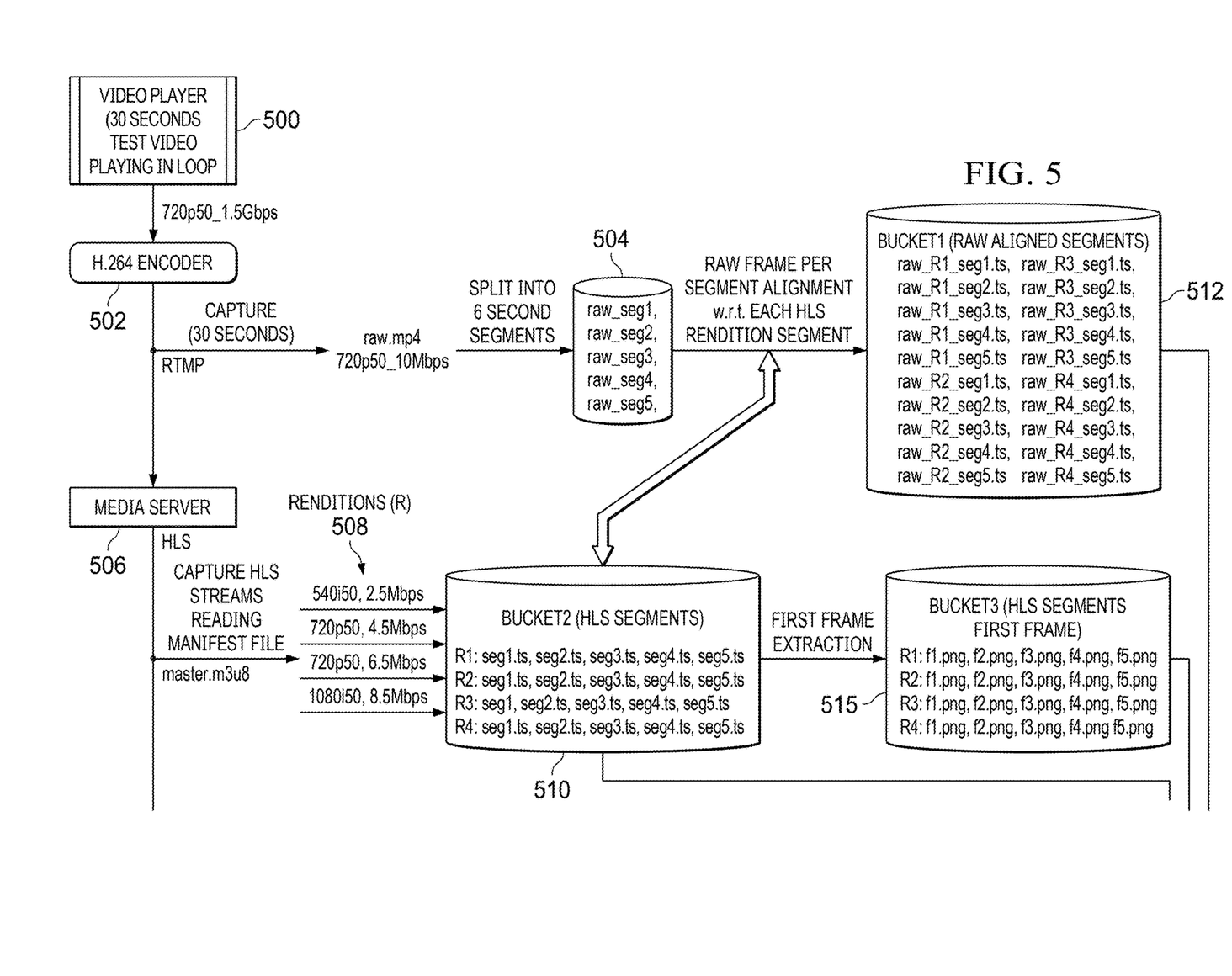
FIG. 5 depicts a reference-based video quality analysis wherein pre-calculated VMAF scores are correlated with VMAF scores computed for playback data of a test video clip.

FIG. 5 depicts the above-described workflow in detail using a test video clip that is rendered in a video player 500. A representative test clip is fixed in length (e.g., 30 seconds) and plays out in a loop such that the frames of the video continually repeat. In this example, the video resolution and frame rate are 720p50_1.5 Gbps. The looping video clip is applied through H.264 encoder 502, the output of which is designated raw.mp4, a compressed version of the 30 second video clip. Its resolution and frame rate is 720p40_10 Mbps and, per default Internet streaming, the file is split into six (6) second segments (raw_seg1, . . . raw_seg 5) and stored in database 504. As also depicted, the RTMP output from the encoder 502 is supplied to a media server 506 for RTMP-to-HLS conversion. The media server 506 outputs a playlist (master.m3u8) with a set of renditions (R) 508. Here, there are four (4) renditions with the identified resolutions and bitrates, namely, 540i50_2.5 Mbps, 720p50_4.5 Mbps, 720p50_ 6.5 Mbps, and 10180i50_8.5 Mbps, as each resolution comprises HLS segments. Thus, the first rendition (R1) has HLS segments {seg1.ts, seg2.ts, seg3.ts, seg4.ts, seg5.ts} and likewise for the other renditions. These HLS segments are represented as bucket2 510. Using the frame alignment algorithm, the raw frame per segment stored in database 504 is aligned with respect to each HLS rendition segment (in bucket2), and this results in a set of raw aligned segments for (in this example) the four (4) renditions, e.g., for R1: {raw_R1_seg1.ts, raw_R1_seg2.ts, raw_R1_seg3.ts, raw_R1_seg4.ts, raw_R1_seg5.ts} and likewise for the other renditions. The raw aligned segments are represented as bucket1 512. As further depicted, the data sets in bucket1 and bucket2 are then subjected to the media analysis 514 to generate the pre-calculated VMAF scores that are stored. As depicted at 516, preferably there is a VMAF score for each and every segment, e.g., {raw_R1_seg1.mp4 vs. R1_seg.mp4, with VMAF=55}, and so forth. This completes the pre-processing (Stage 4 in the workflow described above).

The following describes the post-processing (Stage 5). As depicted in FIG. 5, the system performs a first frame extraction on the HLS segments (bucket2) to generate an HLS segments first frame data set for each rendition, e.g., {R1: f1.png, f2.png, f3.png, f4.png, f5.png} and so on. The results are represented as bucket 3 515. As also depicted in FIG. 5, in this example scenario the HLS video is played out by a browser 518, e.g. Chrome, Firefox, Chromium, or the like. The browser has an ABR player 520 and by default ABR behavior starts playback at 1080i50. In this example scenario (with the network bandwidth variations as shown), and given the 30 second test video, the player has made eight (8) transitions. These transitions are shown in the browser network logs 522, which as noted above shows the list of child segments in the order they were selected and played by the media player 520. The logs may be retrieved as JSON files. Here, for example, the first and second segments (seg1.ts and seg2.ts) were available at 9 Mbps network speed (and thus rendition R4 was used), while the third segment (seg.3.ts) was available at 7.5 Mbps network speed (and thus rendition R3 was used), the fourth segment (seg4.ts) was available a 8.5 Mbps network speed) and thus rendition R4 was used again), and so forth. If necessary, the content provider obtains (e.g., by GET/download) these segments (shown in database 524). The content provider upscales all segments to match the player resolution (1080i50) and converts .ts to mp4. Using the frame alignment algorithm again, the system performs first frame extraction and stores the results as represented by bucket4 526. Thus, and for the first segment that was delivered from rendition R4, bucket4 stores R4_f1.png, and so forth for each segment in the network logs.

At step 528, the system performs the post-streaming calculation, namely, performing segment number correction (if necessary) and mapping to generate the VMAF scores for the playback data. The resulting VMAF scores are again stored in a database. The system now has the pre-computed VMAF scores, together with the post-processed VMAF scores (from the actual playback). By comparing these scores, the system then provides a true QoE indication for what the end user has actually experienced with respect to the test clip. This VMAF per segment is shown at 530. Thus, in this example, and for the seg1.ts at 9 Mpbs, the VMAF score is 81. Segment seg2.ts had a VMAF score of 83, and video quality dropped slightly (VMAF=77) for seg3.ts, possibly as expected given that the lower rendition (R3) was used. The remainder of the VMAF scores (per segment) are then as depicted. With this information, the system (or other analytics 532) may then be carried out and output to interested viewers. Preferably, the system provides VMAF score per frame, or based on an average of a given duration. The above-described method may then be repeated for specific time duration, different geographic location, browser condition, or the like. The nature and type of analytics may vary. For example, the service may provide a customize-able analytical dashboard for results analysis with user- or system-defined pass/fail or good/average/bad criteria, comparison with historical results, health status monitoring and the like. Collected data may be used for other purposes, e.g., machine learning model training and inferencing.

Figure 6:
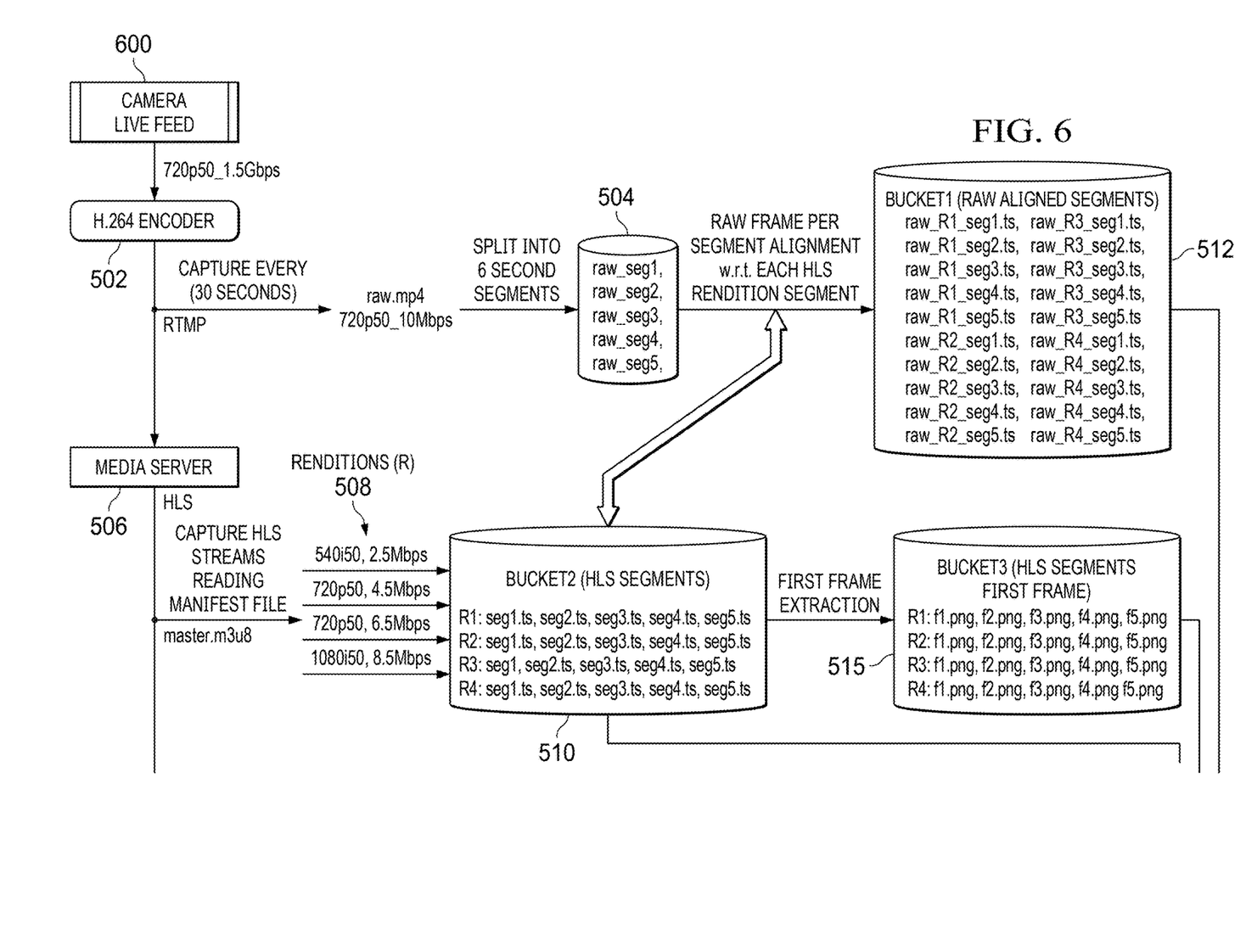
FIG. 6 depicts a reference-based video quality analysis wherein pre-calculated VMAF scores are correlated with VMAF scores computed for playback data of a portion of a live stream.

To that end, FIG. 6 depicts a similar operation of a live video feed (instead of a repeating loop). In this example, the media source is a live camera feed 600. The reminder of the operation is as described above, with the processing continuing as the live video data is captured and processed in the manner described. In this embodiment, the resulting data sets depicted correspond to each thirty (30) second portion of the live camera feed.

Figure 7:
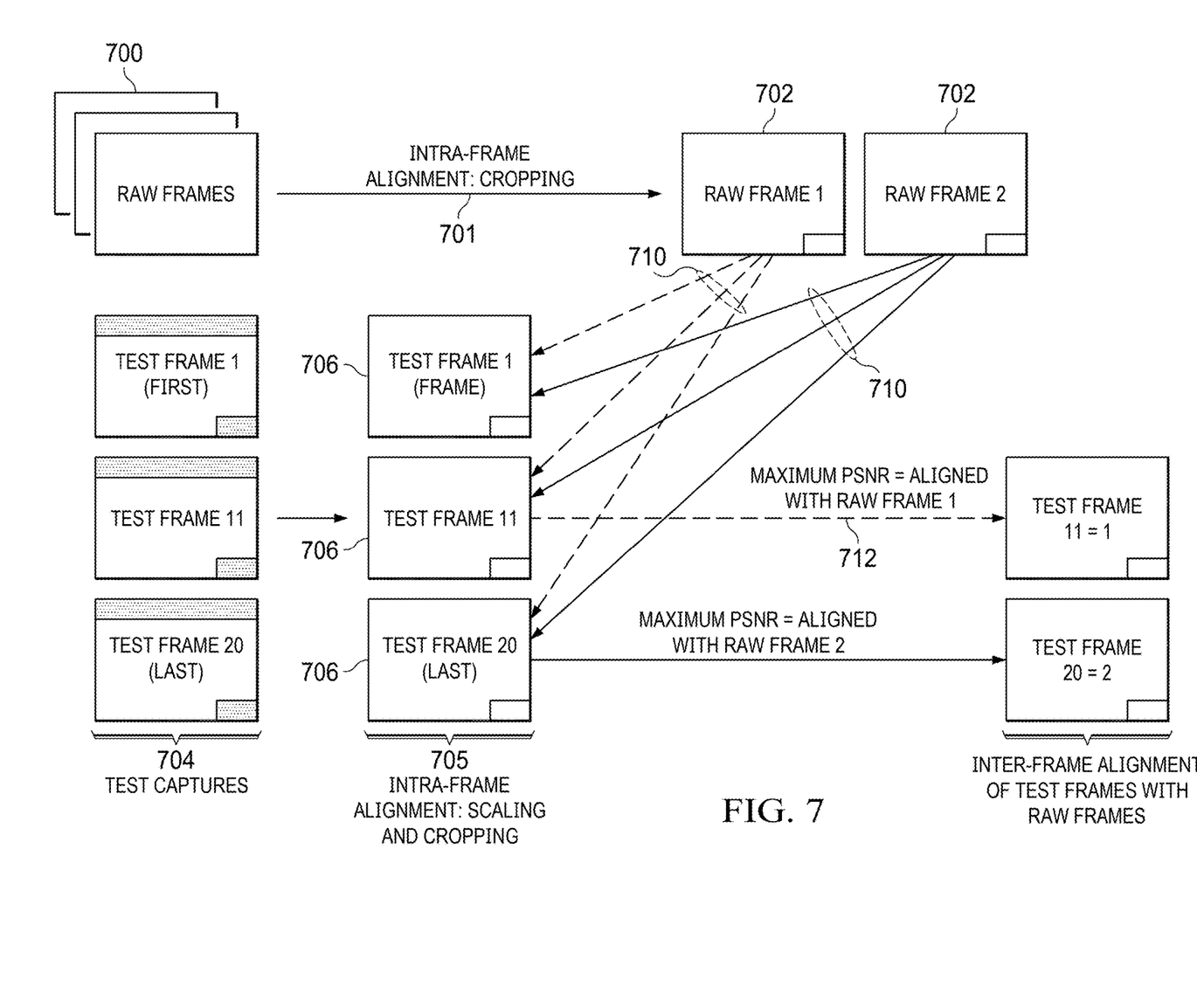
FIG. 7 depicts a representative frame alignment algorithm for use in the pre- and post-processing operations of the subject technique.

FIG. 7 depicts a representative frame alignment algorithm. As noted above, this algorithm is executed on the source video segments and ABR segments and, in particular, the source is segmented to match the ABR segments. To this end, and as shown in FIG. 7, the raw frames 700 of the source are intra-framed aligned by cropping 702 to generate raw frame 1, raw frame 2, etc. 702. Test captures 704 (comprising first frame 1, . . . , and last frame 20) likewise are subject to intra-frame alignment by scaling and cropping 705 to generate test frames 1-20 (in this example) 708. At 710, PSNR for each raw frame 702 is then compared to PSNR for each test frame. This is the inter-frame alignment. At step 712, and for each test frame, the maximum PSNR is determined and the associated test frame identified as the best match. In this example, the maximum PSNR for raw frame 1 is test frame 11, and the maximum PSNR for raw frame 2 is test frame 20. This technique for intra- and inter-frame alignment embodied ensures that the stream and segments are appropriately aligned to facilitate the VMAF pre- and post-calculations previously described.

Based on the comparison VMAF scoring, the VQAaaS platform of this disclosure is then further configured to use tooling to take an automated action, e.g., by adjusting one or more resources (computation, storage, server capability or operation, encoder capability or operation, etc.) of the video delivery platform (or some portion(s) or component(s)

thereof) so as to address any quality issues that have been identified by the service. Typically, tooling is a component of a delivery network or compute infrastructure orchestration or other provisioning layer.

The technique depicted provides significant advantages. Using the above-described methods and system, any content provider is able to measure and compare the QoE of an OTT user for a specific duration of time, different geographic location, browser conditions, and more. The technique also facilitates profiling encoder bandwidth and ABR delivery. By leveraging pre-calculated VMAF scores and correlating them with playback data, this techniques herein further contribute to the assessment and improvement of OTT streaming services, ultimately enhancing users' QoE. The findings can also inform decision-making processes for content providers, enabling them to optimize their streaming platforms and deliver high-quality video experiences to a diverse range of users.

Other Enabling or Support Technologies

As noted above, in one embodiment the techniques of this disclosure may be practiced in association with an overlay network such as the CDN depicted in FIG. 1, and wherein a CDN edge server machine is depicted as in FIG. 2. Typically, the CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN also may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Further enabling technologies for use in association with the disclosed techniques may include cloud compute infrastructure and services. Cloud computing is an information technology delivery model by which shared resources, software and information are provided on-demand over a network (e.g., the publicly-routed Internet) to computers and other devices. This type of delivery model has significant advantages in that it reduces information technology costs and complexities, while at the same time improving workload optimization and service delivery. In a typical use case, an application is hosted from network-based resources and is accessible through a conventional browser or mobile application. Cloud compute resources typically are deployed and supported in data centers that run one or more network applications, typically using a virtualized architecture wherein applications run inside virtual servers, or virtual machines (VMs), which are mapped onto physical servers in the data center. The virtual machines typically run on top of a hypervisor, which allocates physical resources to the virtual machines.

In one or more aspects, the techniques herein may be implemented in a data center operated by a virtual machine (VM) hosting provider. A representative provider is Linode,® infrastructure-as-a-service available from Akamai Technologies, Inc., of Cambridge, Massachusetts.

Generalizing, the techniques may be implemented in a computing platform, wherein one or more functions of the computing platform are implemented conveniently in a cloud-based architecture. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof. Typically, the cloud computing environment has a set of high level functional components that include a front end identity manager, a business support services (BSS) function component, an operational support services (OSS) function component, and the compute cloud components themselves.

According to this disclosure, the services platform described below may itself be part of the cloud compute infrastructure, or it may operate as a standalone service that executes in association with third party cloud compute services.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the subject technique is software written in a given programming language that executes on a hardware or virtual machine platform running an operating system such as Linux. The functionality may be built into other process code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The techniques herein generally provide for the above-described improvements to a technology or technical field, as well as the specific technological improvements to various fields including OTT streaming, Internet-based overlays, efficient utilization of Internet links, and the like, all as described above.

What is claimed follows below:

1. A method of video quality measurement for a source video stream that is available for delivery in segments at multiple bitrates, comprising:
 receiving a first data set, the first data set having been generated prior to streaming of the source video stream by pre-calculating a video quality metric per transcoded rendition, per segment, for the source video stream;
 post-streaming of the source video stream:
  receiving network log data, the network log data comprising a list of segments of the source video stream and in an order that the segments were selected and rendered by a media player, each segment in the list of segments including an identification of its transcoded rendition;
  generating, as a second data set, the video quality metric for each of the segments in the list of segments;
  comparing the video quality metrics in the first and second data sets; and
  taking a given automated action in a streaming delivery platform based at least in part on a result of the comparison of the video quality metrics.

2. The method as described in claim 1 wherein the video quality metric is Video Multimethod Assessment Fusion (VMAF).

3. The method as described in claim 1 wherein the source video stream is an Over-The-Top (OTT) video stream and the delivery is one of: live streaming, and on-demand streaming.

4. The method as described in claim 1 wherein the first data set is generated using a frame alignment algorithm that performs intra- and inter-frame alignment between each raw frame of the source video stream and the segments of each transcoded rendition.

5. The method as described in claim 1 wherein the second data set is generated using a frame alignment algorithm that performs intra- and inter-frame alignment between the first frame of a rendition of the source video stream and an associated segment of a transcoded rendition.

6. The method as described in claim 1 wherein the transcoded renditions are one of: HLS and DASH, and the delivery is Adaptive Bitrate (ABR) streaming.

7. The method as described in claim 1 wherein the method is operated at least in part as-a-service.

8. The method as described in claim 1 wherein the given action provisions additional resources or adjusts existing resources in the streaming delivery platform.

9. The method as described in claim 1 wherein the first and second data sets are generated in part using an adjustment algorithm that measures Peak-Signal-To-Noise (PSTN) ratios of pixels within frames associated with the source video stream.

10. The method as described in claim 1, wherein generating the second data set further includes performing a segment number correction for at least segment in the list of segments.

11. A Software-as-as-Service (SaaS) computing platform, comprising:
 computing hardware; and
 computer software executed on the computing hardware to provide video quality measurement for a source video stream that is available for delivery in segments at multiple bitrates, the computer software comprising program code configured to:
  receive a first data set, the first data set having been generated prior to streaming of the source video stream by pre-calculating a video quality metric per transcoded rendition, per segment, for the source video stream;
  post-streaming of the source video stream:
   receive network log data, the network log data comprising a list of segments of the source video stream and in an order that the segments were selected and rendered by a media player, each segment in the list of segments including an identification of its transcoded rendition;

generate, as a second data set, the video quality metric for each of the segments in the list of segments;

compare the video quality metrics in the first and second data sets; and take a given automated action in a streaming delivery platform based at least in part on a result of the comparison of the video quality metrics.

12. The SaaS computing platform as described in claim 11 wherein the video quality metric is Video Multimethod Assessment Fusion (VMAF).

13. The SaaS computing platform as described in claim 11 wherein the source video stream is an Over-The-Top (OTT) video stream and the delivery is one of: live streaming, and on-demand streaming.

14. The SaaS computing platform as described in claim 11, wherein the program code configured to generate the second data set further includes code that performs a segment number correction for at least one segment in the list of segments.

15. A computer program product in a non-transitory computer readable medium, the computer program product holding computer program instructions that, when executed by one or more processors in a host processing system, provide a service, the computer program instructions comprising program code configured to:

receive a first data set, the first data set having been generated prior to streaming of the source video stream by pre-calculating a video quality metric per transcoded rendition, per segment, for the source video stream;

post-streaming of the source video stream;

receive network log data, the network log data comprising a list of segments of the source video stream and in an order that the segments were selected and rendered by a media player, each segment in the list of segments including an identification of its transcoded rendition;

generate, as a second data set, the video quality metric for each of the segments in the list of segments;

compare the video quality metrics in the first and second data sets; and take a given automated action in a streaming delivery platform based at least in part on a result of the comparison of the video quality metrics.

16. The computer program product as described in claim 15, wherein the video quality metric is Video Multimethod Assessment Fusion (VMAF).

17. The computer program product as described in claim 15, wherein the source video stream is an Over-The-Top (OTT) video stream and the delivery is one of: live streaming, and on-demand streaming.

18. The computer program product as described in claim 15, wherein the program code configured to generate the second data set further includes code that performs a segment number correction for at least one segment in the list of segments.

* * * * *